US012705126B2

(12) United States Patent
Moraru et al.

(10) Patent No.: US 12,705,126 B2
(45) Date of Patent: Aug. 11, 2026

(54) SYSTEM AND CORRESPONDING COMPUTER-IMPLEMENTED METHOD FOR IDENTIFYING EXCEPTION IN BEHAVIOR OF A COMPUTER SYSTEM OR OF AN APPLICATION EXECUTED ON THE COMPUTER SYSTEM

(71) Applicant: Siemens Aktiengesellschaft, Munich (DE)

(72) Inventors: Costel Moraru, Friedberg (DE); Rupert Maier, Eggolsheim (DE); Florian Gerdes, Erlangen (DE); Matthias Saft, Olching (DE)

(73) Assignee: Siemens Aktiengesellschaft, Munich (DE)

( * ) Notice: Subject to any disclaimer, the term of this patent is extended or adjusted under 35 U.S.C. 154(b) by 93 days.

(21) Appl. No.: 18/232,007

(22) Filed: Aug. 9, 2023

(65) Prior Publication Data

US 2025/0053472 A1 Feb. 13, 2025

(51) Int. Cl.

*G06F 11/00* (2006.01)
*G06F 11/07* (2006.01)
*G06F 11/34* (2006.01)

(52) U.S. Cl.

CPC ...... *G06F 11/0769* (2013.01); *G06F 11/3476* (2013.01)

(58) Field of Classification Search

CPC .. G06F 11/2252; G06F 11/073; G06F 1/3206; G06F 1/26; Y02D 10/00

See application file for complete search history.

(56) References Cited

U.S. PATENT DOCUMENTS 5,724,503 A * 3/1998 Kleinman ............... G06F 9/454 719/318
10,055,277 B1 * 8/2018 Niederman ......... G06F 11/0709
(Continued)

FOREIGN PATENT DOCUMENTS

WO WO 2015047121 A1 4/2015

OTHER PUBLICATIONS

L. Wu, F. Li, Y. Wu and T. Zheng, "GGF: A Graph-based Method for Programming Language Syntax Error Correction," 2020 IEEE/ACM 28th International Conference on Program Comprehension (ICPC), Seoul, Korea, Republic of, 2020, pp. 139-148 (Year: 2020).*

(Continued)

*Primary Examiner* — Bryce P Bonzo
*Assistant Examiner* — Gabriella Kanani Shelton
(74) *Attorney, Agent, or Firm* — Schmeiser Olsen PLLC

(57) ABSTRACT

The present invention relates to a system and corresponding computer-implemented method for identifying exceptions in behavior of an application executed on the computer system. The system comprises: a component for building at least one pattern from monitored signals over a specific time period whereby the pattern is an exception identified via signal constellation out of system-side recorded resource usage data and measured energy consumption data of the entire computer system, a component for identifying an exception by comparing the at least one pattern with one or more afore built patterns each labelled with a pre-defined exception classification, a storage component for storing at least one compared, unmatched pattern for subsequent exception identification, wherein the unmatched pattern is labelled with any pre-defined exception classification via user interaction, an output component for outputting an alarm message onto an output device if any compared pattern matches.

8 Claims, 3 Drawing Sheets

(56) References Cited

U.S. PATENT DOCUMENTS

| | | | | |
|---|---|---|---|---|
| 11,262,831 | B2 * | 3/2022 | Hsu | G06F 1/329 |
| 11,397,634 | B1 * | 7/2022 | Monga | G06F 11/0709 |
| 11,645,146 | B2 * | 5/2023 | Safary | G06F 11/0793 714/26 |
| 2017/0371856 | A1 * | 12/2017 | Can | G06V 30/19173 |
| 2023/0147668 | A1 * | 5/2023 | Penugonda | G06F 11/0772 714/38.1 |

OTHER PUBLICATIONS

T. Thomas, "Exploring the usability and effectiveness of interactive annotation and code review for the detection of security vulnerabilities," 2015 IEEE Symposium on Visual Languages and Human-Centric Computing (VL/HCC), Atlanta, GA, USA, 2015, pp. 295-296 (Year: 2015).*

Urraca et al. (Ruben Urraca, Ana M. Gracia-Amillo, Thomas Huld, Francisco Javier Martinez-de-Pison, Jörg Trentmann, Anders V. Lindfors, Aku Riihelä, Andres Sanz-Garcia, "Quality control of global solar radiation data with satellite-based products," Solar Energy, vol. 158, 2017, pp. 49-62 (Year: 2017).*

"Task Manager," Microsoft Learn, Jan. 29, 2019 (Year: 2019).*

"Task Manager (Windows)," Wikipedia, Jun. 25, 2023 (Year: 2023).*

"What is Cuda Engine Graph Reported in Manager?" Vivek Guptha, 2021 (Year: 2021).*

Merriam-Webster, "application" (Year: 2026).*

Merriam-Webster, "constellation" (Year: 2026).*

Merriam-Webster, "consumption" (Year: 2026).*

Merriam-Webster, "power" (Year: 2026).*

Merriam-Webster, "server" (Year: 2026).*

Merriam-Webster, "signal" (Year: 2026).*

"Signal Constellations", retrieved on Jan. 13, 2026 from the Internet: <URL: https://www.eng.auburn.edu/~roppeth/courses/TIMS-manuals-r5/TIMS%20Experiment%20Manuals/Student_Text/Vol-D1/D1-09.pdf.>, 10 pages.

* cited by examiner

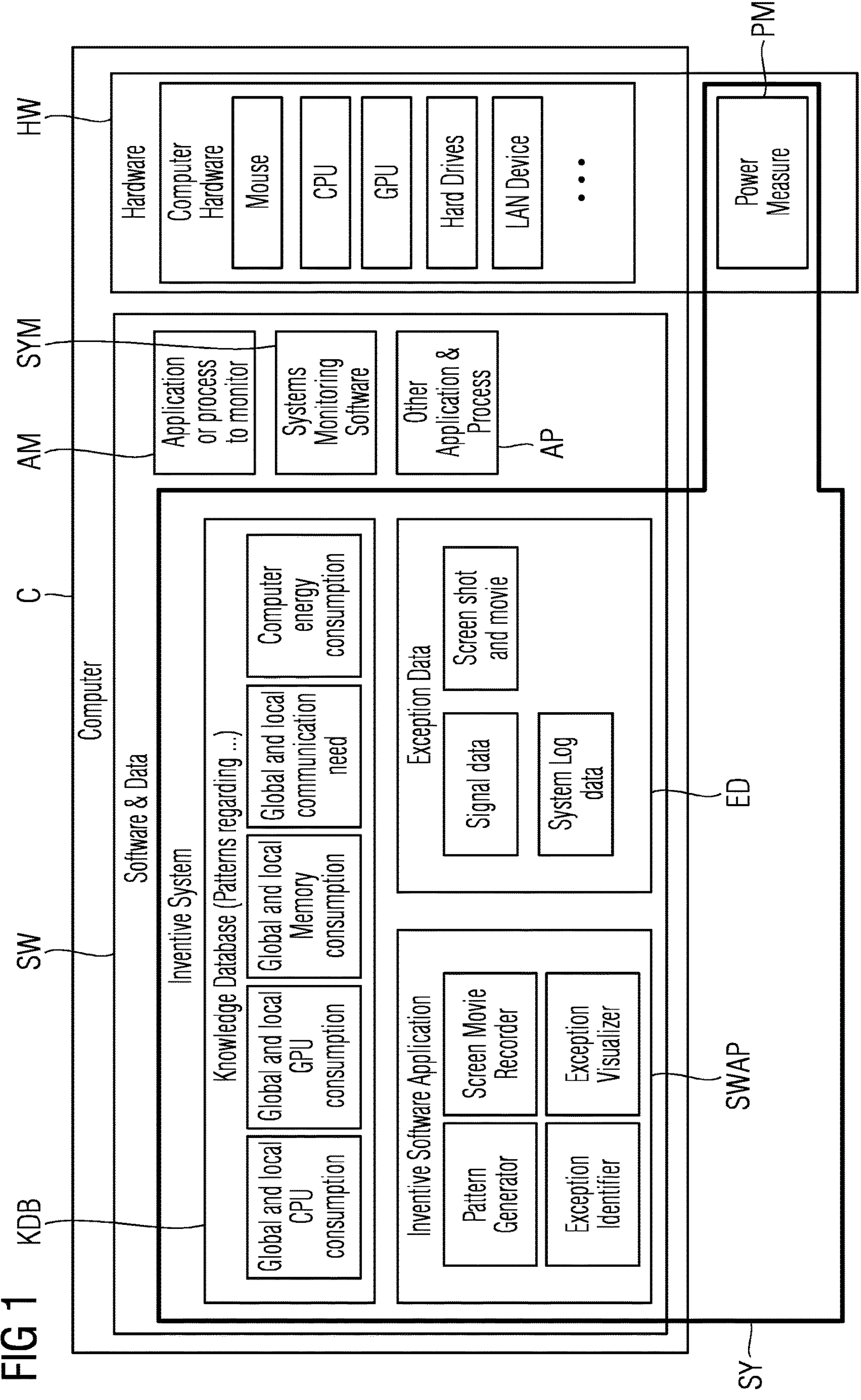
FIG 1
HW
SYM
AM
C
SW
KDB
PM
AP
ED
SWAP
SY
Computer
Hardware
Computer Hardware
Mouse
CPU
GPU
Hard Drives
LAN Device
Power Measure
Software & Data
Application or process to monitor
Systems Monitoring Software
Other Application & Process
Inventive System
Knowledge Database (Patterns regarding ...)
Global and local CPU consumption
Global and local GPU consumption
Global and local Memory consumption
Global and local communication need
Computer energy consumption
Exception Data
Screen shot and movie
Signal data
System Log data
Inventive Software Application
Pattern Generator
Screen Movie Recorder
Exception Identifier
Exception Visualizer

SYSTEM AND CORRESPONDING COMPUTER-IMPLEMENTED METHOD FOR IDENTIFYING EXCEPTION IN BEHAVIOR OF A COMPUTER SYSTEM OR OF AN APPLICATION EXECUTED ON THE COMPUTER SYSTEM

FIELD OF TECHNOLOGY

The present invention relates to a system and corresponding computer-implemented method for identifying exceptions in behavior of a computer system or of an application executed on the computer system.

BACKGROUND

Error detection in software is usually executed via dedicated manual or automatically performed tests in the development or maintenance phase of the software lifecycle. Additionally, suitable error messages are defined during development, and provided by the software to identify exceptions or errors while it is executed. These error messages can be visualized directly via user interface (if helpful and available). Otherwise, they can be registered as entries in log files.

In all these cases the related errors were anticipated (foreseen) in advance as possible error situation by the software developer. Software is usually implemented by using many 3rd party software modules and libraries. These modules usually underly frequent changes and updates. Because of this, updates can lead to incompatibilities and unforeseen errors. System or application behavior is not identified and may lead to somehow correlated subsequent faults later on.

There is an approach published under WO 2015/047121 A1 which sets its focus on embedded current signature analysis and remote condition monitoring for industrial machinery. This approach is related to error detection in hardware but is not applied for error detection in software.

In view of this, it is an objective of the present invention to present an improved concept or system or method that allows for an efficient exception/error identification in a computer system caused by software or in an application executed in the computer system.

SUMMARY

The above-mentioned object is achieved by a method and one or more apparatus and/or a system and/or a device according to the features of the independent claims.

Preferred embodiments of the invention are described in the dependent claims. Any combination of the features of the dependent claims to each other and with the features of the independent claims is possible.

An aspect of the invention is a system for identifying error and/or exception in behavior of an application executed on the computer system, comprising:

- a component for building at least one pattern from monitored signals over a specific time period whereby the pattern is an exception identified via signal constellation out of system-side recorded resource usage data and measured energy consumption data of the entire computer system,
- a component for identifying an exception by comparing the at least one pattern with one or more afore built patterns each labelled with a pre-defined exception classification,
- a storage component for storing at least one compared, unmatched pattern for subsequent exception identification, wherein the unmatched pattern is labelled with any pre-defined exception classification via user interaction,
- an output component for outputting an alarm message onto an output device if any compared pattern matches.

Recorded resource usage data and/or measured energy consumption data and/or unmatched data can be visualized onto an output device. Such data visualized on the output device are recordable and/or recorded in order to identify patterns in the amplitude and/or in the time course of the monitored signals. System log data may be also history system state data from other applications and/or processes from another computer system can be considered for building the at least one pattern.

A benefit of the invention is:

Usage of energy consumption as an additional signal together with the established signals of computer system leads to a more likely detection of exceptions/errors and to a detection of a higher variety of errors. The solution sketched is non-intrusive considering the original software. Software to be observed doesn't have to be modified. This is much more attractive for legacy systems or software programs which are not to your disposal.

It can be shipped as a separate module:

Running for any program without modification.

It can be activated or deactivated on demand.

A further aspect of the invention is a computer-implemented method for identifying error and/or exception in behavior of an application executed on the computer system, comprising the method steps of:

- building at least one pattern from monitored signals over a specific time period whereby the pattern is an exception identified via signal constellation out of system-side recorded resource usage data and measured energy consumption data of the entire computer system,
- identifying an exception by comparing the at least one pattern with one or more afore built patterns each labelled with a pre-defined exception classification,
- storing at least one compared, unmatched pattern for subsequent exception identification, wherein the unmatched pattern is labelled with any pre-defined exception classification via user interaction,
- outputting an alarm message onto an output device if any compared pattern matches.

Embodiments as described above for the systems can be analogous applied for the method and for computer program (product) and for the computer-readable storage medium.

Systems can be implemented by hardware, firmware and/or software modules or a combination of them.

The computer-readable storage medium stores instructions executable by one or more processors of a computer, wherein execution of the instructions causes the computer system to perform the method. The one or more processors can be distributed organized on servers or in a cloud.

The computer program (product) is executed by one or more processors of a computer and performs the method.

BRIEF DESCRIPTION

The foregoing and other aspects of the present invention are best understood from the following detailed description when read in connection with the accompanying drawings. For the purpose of illustrating the invention, there are shown in the drawings embodiments that are presently preferred, it being understood, however, that the invention is not limited to the specific instrumentalities disclosed. In the figures, identical or functionally identical elements are denoted by identical reference signs. Included in the drawings are the following figures:

FIG. 1 illustrates an overview of the inventive system with possible components interacting with each other;

DETAILED DESCRIPTION

Figure 2:
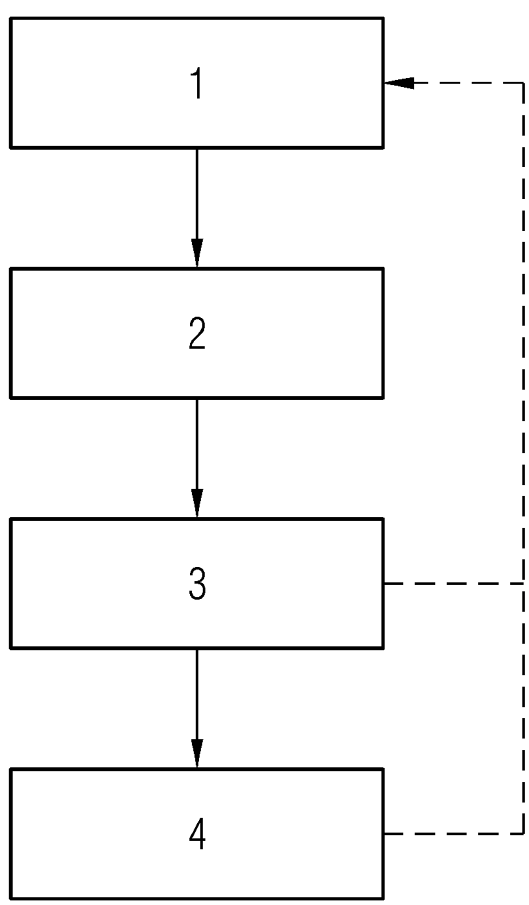
FIG. 2 shows a flow chart of the inventive method steps.

The inventive system SY sets up on a computer system C consisting of diverse hardware HW and software SW components. Software SW can be divided in "Application or process to monitor" AM, in "Systems Monitoring Software" SYM, in software system "Software Application" SWAP and "Other Applications & Processes" AP.

Hardware can include:

a "computer hardware" with CPU, GPU, hard drives, LAN devices and a computer mouse where all the software listed above is running An external or integrated "Power Measure" PM which is part of the inventive system.

The application or process which needs to be monitored is executable and/or executed on the computer system. The system SY focusses on errors or runtime problems that are related to this application or process. The behavior and resource usage/consumption of other applications or processes should be monitored in order to differentiate between interesting and irrelevant patterns in the system behavior.

The computer system includes multiple hardware components like CPU (Central Processing Unit), GPU (Graphical Processing Unit), mouse, hard drives, ethernet, WLAN, . . . ). All these kinds of components are used via their device drivers. Usually, the availability and status of these devices can be derived from the status of their drivers. So, it is possible to identify correlations between the status of these hardware components with the usability of the computer and its software components. Based on this, a software component "pattern generator" in the software system SWAP can derive patterns that represent the correlations in different situations.

For instance:

When the monitored application gets data from another computer, the software system SWAP analyzes this data, and visualizes a real-time graph calculated from this data. The following correlation can be registered (see FIG. 3 below):

The network communication required from the monitored application increases and generates a specific signal behavior over time.

The CPU usage required from the monitored application increases and generates a specific signal behavior over time.

The GPU usage required by the application increases and generates a specific signal behavior over the time.

The active processes in the current situation interact differently and generate a different signal behavior.

The overall energy consumption rises and generates a further signal behavior over the time. This signal comes from the component "Power Measure" PM.

Based on this data, the component "Pattern Generator" monitors permanently the current situation, identifies relevant constellations, and derives relevant pattern out of it. If the pattern is new, that means not "known" in the Knowledge Database KDB then classification is required via user interaction. The new labelled pattern with a pre-defined exception/error classification is stored in the "Knowledge Database".

A system monitoring software component is usually part of the "software system" SW. It logs errors, monitors the status of hard- and software components and delivers important runtime information regarding the consumption of the computer resources (e.g., percentage of the memory, network, CPU and GPU consumption by every software component—see picture 2 and 3). This information represents a base for identifying patterns in the system behavior and to which component and status the identified behavior belongs.

The knowledge database KDB holds patterns regarding different signal constellations identified and/or registered by the "Pattern Generator".

These patterns are input for the "Exception Identifier" to identify exceptions in a concrete application "Application or process to monitor".

Each pattern can hold details of the following information:

Characteristics of the signal sequences of all system signals used by the system SY (if available).

Characteristics of the energy consumption sequences of the computer and all its hardware components.

Timing between the different signal sequences.

Log data messages (if available).

Content of screen shots to fetch pattern regarding signal constellations (if available).

When an exception is identified by the system software SWAP, the "Exception Identifier" persists the related exception data. Based on this data the user is supported by the "Exception Visualizer" to get visualized all information regarding the exception. By analyzing this data, the user can find out, what was the real reason for the exception is.

The minimum details hold in each exception comes from the following information:

Point in time of the exception moment.

Movie that holds the screen content in the exception moment.

Data of the different signals monitored by the system software SWAP at the exception moment (e.g., system data regarding CPU or GPU, status and CPU usage of $3^{rd}$ party software used by/correlated to the application/process to monitor).

System log data around the exception moment.

Figure 3:
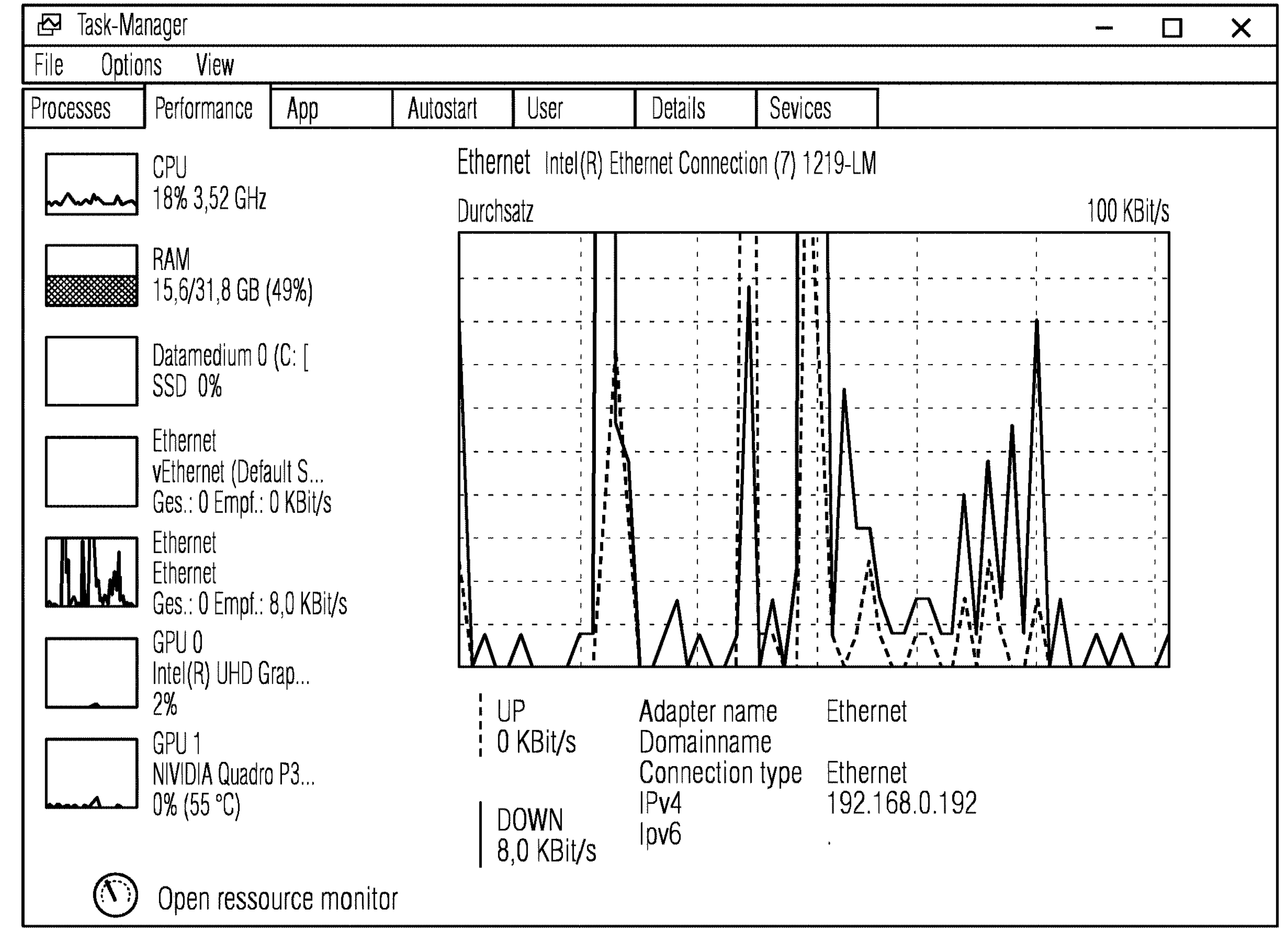
FIG. 3 depicts a computer system's performance via a task manager.

In FIG. 3 is shown a computer system's performance. For instance, in the task manager of the operation system MS-Windows there is a list of active processes, normally cause by one or more applications. In FIG. 3 the CPU, RAM, SSD disk, ethernet usage/load is illustrated. Such data can be monitored and also stored in a log file.

Via the power measurement by the component "Power Measure" PM an important additional signal is available. The "Software System" SWAP uses this component (could be hardware and/or software) to measure the overall energy consumption of the computer system over the time. It combines this signal with already available signals to get a reliable identification of different constellations on the base of the registered patterns.

It contains specific timing characteristics in the usage of hardware components by software/applications running on the computer.

For instance:

Huge calculation needs—leads to improved CPU consumption—leads to enhanced speed of CPU clock—leads to a typical pattern in the energy consumption with a delay.

Realtime visualization of signals on the screen—leads to enhanced GPU consumption—leads to a typical pattern in the energy consumption with a delay.

Storing huge amounts of data to the local hard disk—leads to a typical pattern (related to the data amount) in energy consumption with a delay.

The component "Pattern Generator" runs while the Software component SWAP is running. It monitors for specific constellations in the behavior of the received signals, e.g., from the "application or process to monitor" and from component PM.

It identifies all kinds of such constellations and tries to assign the related application or process to the constellations. For automated assignment of the responsible application or process, it analyzes which software/application is executed while the constellations appear.

This is useful to find out where constellations are the result of overlaying patterns that origin comes from different applications and/or processes. Identifying specific exceptions of the "Application or Process to monitor" is needed.

When the Pattern Generator identifies a relevant, new (up to now unknown, unmatched) constellation, it generates a new pattern out of it and stores it in the knowledge database KDB.

Usually, new patterns are labelled with classification e.g., "valid situation" (no exception). In case of faulty situations (especially in the phase of gathering information for the knowledge base) the user may be asked to classify "faulty situations" manually.

In special cases—when the "Application or process to monitor" generates a specific error message on a screen/display—a "faulty situation" is identified automatically. The related screen shot or log output is analyzed for error/alarm messages or exceptions.

The component "Screen Movie Recorder" is permanently recording the computers screen or observable system behavior. As soon as the component "Exception Identifier" identifies an exception, it extracts the related movie data from of the related moment and copies it preferably combined with other data to the so called "Exception Data".

The component "Exception Identifier" compares the current signal exceptions with afore built pattern from the knowledge base. Depending on the configuration settings the "Exception Identifier" identifies stores and/or reports data regarding to the exceptions.

The following features can be supported:

Analysis to identify all constellations where a new pattern is recognized as exception.

Analysis to identify all constellations as exceptions where the "application or process to monitor" delivered a new/unknown pattern.

Analysis to identify all constellations as exceptions where the "application or process to monitor" delivered a pattern which matches a known, faulty pattern from the knowledge database.

Save the exception data (e.g., log files, screen content/movie, energy consumption and application system signals (global and application/process specific).

Generate an alarm message (e.g. Email/SMS) on exception identification.

The component "Exception Visualizer" helps to visualize all data stored to a registered exception. Based on the exceptions signal, log, and screen movie data, the user is supported to identify the reason of the reported exception.

FIG. 2 shows a flow chart of the inventive method steps:

The starting step 1 is performed by the (software) component "pattern generator": building at least one pattern from monitored received signals over a specific time period whereby the pattern is an exception identified via signal constellation out of system-side recorded (and stored) resource usage data and measured (and stored) energy consumption data of the entire computer system.

The next step 2 is performed by the (software) component "exception identifier": identifying an exception by comparing the at least one pattern with one or more afore built (and stored) patterns each labelled with a pre-defined exception classification.

The next step 3 is performed by a storage component, e.g., knowledge database KDB: storing at least one compared, unmatched pattern for subsequent exception identification, wherein the unmatched pattern is labelled with any pre-defined exception classification via user interaction If the pattern is unmatched and then classified via user interaction then the method can be repeated by starting with step 1. If the pattern is matched then the next step 4 is performed by a not illustrated output component: outputting an alarm message onto an output device e.g., display, acoustic device and/or may be haptic device.

The method steps can be repeated by starting with step 1 and so on.

The invention has been described in detail with reference to embodiments thereof and examples. Variations and modifications are possible.

The system and its parts can be configured to performing the inventive method steps.

Parts of the system can be integrated into a (computer) cloud system. It includes one or more processors and can be coupled with data, where said processor(s) is/are configured to execute the method steps.

The method can be executed by at least one processor such as a microcontroller or a microprocessor, by an Application Specific Integrated Circuit (ASIC), by any kind of computer, including mobile computing devices such as tablet computers, smartphones or laptops, or by one or more servers in a control room or cloud.

For example, a processor, controller, or integrated circuit of the systems and/or computer and/or another processor may be configured to implement the acts described herein.

The above-described method may be implemented via a computer program (product) including one or more computer-readable storage media having stored thereon instructions executable by one or more processors of a computing system and/or computing engine. Execution of the instructions causes the computing system to perform operations corresponding with the acts of the method described above.

The instructions for implementing processes or methods described herein may be provided on non-transitory computer-readable storage media or memories, such as a cache, buffer, RAM, FLASH, removable media, hard drive, or other computer readable storage media. A processor performs or executes the instructions to train and/or apply a trained model for controlling a system. Computer readable storage media include various types of volatile and non-volatile storage media. The functions, acts, or tasks illustrated in the figures or described herein may be executed in response to one or more sets of instructions stored in or on computer readable storage media. The functions, acts or tasks may be independent of the particular type of instruction set, storage media, processor or processing strategy and may be performed by software, hardware, integrated circuits, firmware, micro code and the like, operating alone or in combination. Likewise, processing strategies may include multiprocessing, multitasking, parallel processing and the like.

In addition, and alternatively, it is possible that a control device receives other computer-readable control signals in order to initiate the mentioned steering/control process by its processor(s).

The invention has been described in detail with reference to embodiments thereof and examples. Variations and modifications may, however, be effected within the spirit and scope of the invention covered by the claims. The phrase "at least one of A, B and C" as an alternative expression may provide that one or more of A, B and C may be used.

The terminology used herein is for the purpose of describing particular embodiments only and is not intended to be limiting of example embodiments of the invention. As used herein, the singular forms "a", "an", and "the" are intended to include the plural form as well, unless the context clearly indicates otherwise.

It is to be understood that the elements and features recited in the appended claims may be combined in different ways to produce new claims that likewise fall within the scope of the present invention. Thus, whereas the dependent claims appended below depend on only a single independent or dependent claim, it is to be understood that these dependent claims may, alternatively, be made to depend in the alternative from any preceding or following claim, whether independent or dependent, and that such new combinations are to be understood as forming a part of the present specification.

None of the elements recited in the claims are intended to be a means-plus-function element unless an element is expressly recited using the phrase "means for" or, in the case of a method claim, using the phrases "operation for" or "step for".

While the present invention has been described above by reference to various embodiments, it should be understood that many changes and modifications may be made to the described embodiments. It is therefore intended that the foregoing description be regarded as illustrative rather than limiting, and that it be understood that all equivalents and/or combinations of embodiments are intended to be included in this description.

The invention claimed is:

1. A computer system, said computer system comprising one or more processors and a computer-readable storage medium storing instructions for execution by the one or more processors to cause the computer system to perform a method, said method comprising:

receiving, in real time by the one or more processors from an application while the application is running on the computer system, electronic signals of time dependent resource usage by the application and time dependent energy consumption of the computer system;

monitoring, while the application is running, for relevant signal constellations in a behavior of the received signals, wherein the relevant signal constellations appear during said monitoring while the application is running, wherein an identification of a pattern is enabled from the relevant signal constellations out of system-side recorded resource usage data and measured energy consumption data of the entire computer system, wherein the pattern includes: characteristics of energy consumption sequences of all hardware components of the computer system, and timing between the different signal sequences, wherein the pattern includes an error in the running application, wherein the application has been assigned to the relevant signal constellations, and wherein the pattern holds at least the following information: characteristics of signal sequences of all system signals used by the computer system;

measuring an overall energy consumption of the computer system over time, wherein the overall energy consumption of the computer system over time contains specific timing characteristics in usage of hardware components by the application while the application is running in real time; and outputting, in real time by the one or more processors on an output device, an alarm message pertaining to the error, wherein the output device is selected from the group consisting of the display device, an acoustic device, and a haptic device.

2. The computer system according to claim 1, wherein the time dependent resource usage by the application and the time dependent energy consumption of the computer system are visualized onto the output device of the computer system.

3. The computer system according to claim 1, wherein the pattern holds at least the following information: characteristics of energy consumption sequences of the computer system and all hardware components of the computer system, timing between the different signal sequences, log data messages, and content of screen shots from which the pattern can be fetched.

4. The computer system according to claim 1, wherein the pattern is an exception in behavior of the application running on the computer system, and wherein available information relating to the exception comprises: an exception moment which is a point in time at which the exception occurred; and data of different signals monitored at the exception moment wherein the different signals include a signal pertaining to central processing unit (CPU) usage of third party software used by or correlated to the application.

5. The computer system according to claim 4, wherein the available information further comprises: a movie that includes screen content at the exception moment; and system log data around the exception moment.

6. A computer-implemented method, said method comprising:

receiving, in real time by one or more processors of a computer system from an application while the application is running on the computer system, electronic signals of time dependent resource usage by the application and time dependent energy consumption of the computer system;

monitoring, while the application is running, for relevant signal constellations in a behavior of the received signals, wherein the relevant signal constellations appear during said monitoring while the application is running, wherein an identification of a pattern is enabled from the relevant signal constellations out of system-side recorded resource usage data and measured energy consumption data of the entire computer system, wherein the pattern includes: characteristics of energy consumption sequences of all hardware components of the computer system, and timing between the different signal sequences, wherein the pattern includes an error in the running application, wherein the application has been assigned to the relevant signal constellations, and wherein the pattern holds at least the following information: characteristics of signal sequences of all system signals used by the computer system;

measuring an overall energy consumption of the computer system over time, wherein the overall energy consumption of the computer system over time contains specific timing characteristics in usage of hardware components by the application while the application is running in real time; and outputting, in real time by the one or more processors on an output device, an alarm message pertaining to the error, wherein the output device is selected from the group consisting of the display device, an acoustic device, and a haptic device.

7. The method according to claim 6, wherein the time dependent resource usage by the application and the time dependent energy consumption of the computer system are visualized onto the output device.

8. A computer program product, said computer program product comprising a non-transitory computer-readable storage medium storing instructions for execution by one or more processors of the computer system to cause a computer system to perform a method, said method comprising:

receiving, in real time by the one or more processors from an application while the application is running on the computer system, electronic signals of time dependent resource usage by the application and time dependent energy consumption of the computer system;

monitoring, while the application is running, for relevant signal constellations in a behavior of the received signals, wherein the relevant signal constellations appear during said monitoring while the application is running, wherein an identification of a pattern is enabled from the relevant signal constellations out of system-side recorded resource usage data and measured energy consumption data of the entire computer system, wherein the pattern includes: characteristics of energy consumption sequences of all hardware components of the computer system, and timing between the different signal sequences, wherein the pattern includes an error in the running application, wherein the application has been assigned to the relevant signal constellations, and wherein the pattern holds at least the following information: characteristics of signal sequences of all system signals used by the computer system;

measuring an overall energy consumption of the computer system over time, wherein the overall energy consumption of the computer system over time contains specific timing characteristics in usage of hardware components by the application while the application is running in real time; and outputting, in real time by the one or more processors on an output device, an alarm message pertaining to the error, wherein the output device is selected from the group consisting of the display device, an acoustic device, and a haptic device.

* * * * *